(12) United States Patent
Pan (10) Patent No.: US 9,709,194 B1
(45) Date of Patent: Jul. 18, 2017

(54) ELONGATABLE AND RETRACTABLE HOSE

(71) Applicant: Telebrands Corp., Fairfield, NJ (US)

(72) Inventor: Yun Pan, Shenzhen (CN)

( * ) Notice: Subject to any disclaimer, the term of this patent is extended or adjusted under 35 U.S.C. 154(b) by 30 days.

(21) Appl. No.: 14/693,739

(22) Filed: Apr. 22, 2015

Related U.S. Application Data (60) Provisional application No. 61/983,524, filed on Apr. 24, 2014.

(51) Int. Cl.
*F16L 11/00* (2006.01)
*F16L 11/20* (2006.01)

(52) U.S. Cl.
CPC ........................... *F16L 11/20* (2013.01)

(58) Field of Classification Search
CPC ..................... F16L 11/00; F16L 33/2076
USPC ............... 138/121, 122, 118, 119, 109, 108; 285/256, 259
See application file for complete search history.

(56) References Cited

U.S. PATENT DOCUMENTS

| | | | |
|---|---|---|---|
| 184,907 A | 11/1876 | Reed | |
| 543,220 A | 7/1895 | Ross | |
| 674,045 A | 5/1901 | Sullivan | |
| 919,444 A | 4/1909 | Loetzer | |
| 1,220,661 A | 3/1917 | Many | |
| 1,301,354 A | 4/1919 | Baird | |
| 1,361,206 A | 12/1920 | Verhunce | |
| 2,035,736 A | 3/1936 | Baird | |
| 2,097,862 A | 4/1936 | McKay | |
| 2,076,632 A | 4/1937 | Goodall | |
| 2,409,161 A | 10/1946 | Sivertsen | |
| 2,461,594 A | 2/1949 | Flounders | |
| 2,634,071 A | 4/1953 | Lund | |
| 2,640,502 A | 6/1953 | Powers | |
| 2,677,393 A * | 5/1954 | Cornelius | F16J 3/047 138/30 |
| 2,858,854 A | 11/1958 | Daggett | |
| 2,899,982 A | 8/1959 | Harpfer | |
| 3,058,493 A | 10/1962 | Muller | |
| D197,378 S | 1/1964 | Greczin | |
| 3,233,024 A | 2/1966 | Jackson et al. | |
| D209,382 S | 11/1967 | Nardone | |
| 3,446,247 A | 5/1969 | Manning | |
| 3,530,900 A | 9/1970 | Kish | |
| 3,543,805 A | 12/1970 | Matthews et al. | |
| 3,739,459 A * | 6/1973 | Otani | E02D 5/28 138/154 |
| 3,831,635 A | 8/1974 | Burton | |

(Continued)

FOREIGN PATENT DOCUMENTS

| | | |
|---|---|---|
| DE | 197 52 008 A1 | 5/1999 |
| EP | 0 039 744 | 5/1980 |

(Continued)

OTHER PUBLICATIONS

X-Hose, available at http://emsoninc.com/xhose-0, accessed on Aug. 26, 2014.

(Continued)

*Primary Examiner* — Patrick F Brinson
(74) *Attorney, Agent, or Firm* — Cooper & Dunham, LLP (57) ABSTRACT

An elongatable and retractable hose includes an inner fluid conductor made of an elastomeric material having raised longitudinal ribs thereon and an outer jacket disposed around the inner fluid conductor.

10 Claims, 14 Drawing Sheets

(56) References Cited

U.S. PATENT DOCUMENTS

| | | | |
|---|---|---|---|
| 3,878,867 A * | 4/1975 | Dirks | F16L 55/054 138/30 |
| 4,114,656 A * | 9/1978 | Kish | F16L 33/2071 138/109 |
| 4,192,351 A | 3/1980 | Henry | |
| 4,226,446 A * | 10/1980 | Burrington | F16L 33/2076 285/256 |
| 4,506,430 A | 3/1985 | Guzay et al. | |
| D288,838 S | 3/1987 | Hengesbach | |
| 4,690,435 A | 9/1987 | Manning et al. | |
| 4,892,442 A * | 1/1990 | Shoffner | B29C 47/0014 138/108 |
| 5,027,864 A * | 7/1991 | Conti | G02B 6/4459 138/108 |
| D318,903 S | 8/1991 | Lenberg | |
| 5,044,671 A | 9/1991 | Chisnell et al. | |
| 5,120,092 A | 6/1992 | Gorog | |
| 5,158,005 A | 10/1992 | Negishi et al. | |
| 5,229,176 A | 7/1993 | Freeman | |
| 5,238,328 A * | 8/1993 | Adams | F16L 58/1045 138/141 |
| 5,358,012 A * | 10/1994 | Kish | F16L 33/2076 138/109 |
| 5,483,412 A | 1/1996 | Albino et al. | |
| D381,405 S | 7/1997 | Waidele | |
| D387,146 S | 12/1997 | Morrison | |
| D392,722 S | 3/1998 | Kurz | |
| D394,306 S | 5/1998 | Clivio | |
| 5,797,629 A * | 8/1998 | Beagle | F16L 33/2076 285/256 |
| 5,814,371 A * | 9/1998 | Ferralli | B05D 7/222 427/236 |
| D400,970 S | 11/1998 | Voo | |
| D402,357 S | 12/1998 | Clivio | |
| D403,056 S | 12/1998 | Clivio | |
| D406,881 S | 3/1999 | Kuwabara | |
| D412,738 S | 8/1999 | Kuwabara | |
| 5,931,200 A | 8/1999 | Mulvey et al. | |
| D413,968 S | 9/1999 | Lester | |
| D430,272 S | 8/2000 | Hung-Lin | |
| 6,102,078 A | 8/2000 | Kramer, Jr. | |
| D430,922 S | 9/2000 | Hung-Lin | |
| D442,267 S | 5/2001 | Kouda | |
| D443,863 S | 6/2001 | Maccarone | |
| D444,723 S | 7/2001 | Honma | |
| 6,270,125 B1 | 8/2001 | Rpwley et al. | |
| 6,279,614 B1 * | 8/2001 | Riesselmann | B32B 1/08 138/122 |
| 6,341,625 B1 | 1/2002 | Maruyama et al. | |
| D463,537 S | 9/2002 | Kozu | |
| D470,222 S | 2/2003 | Nortier | |
| 6,523,539 B2 | 2/2003 | McDonald et al. | |
| 6,540,205 B1 | 4/2003 | Stafford | |
| D479,741 S | 9/2003 | Chiu | |
| D482,761 S | 11/2003 | Gotoh et al. | |
| D483,096 S | 12/2003 | Gotoh et al. | |
| D486,204 S | 2/2004 | Tripp | |
| D488,544 S | 4/2004 | Akaltan | |
| 6,824,118 B1 | 11/2004 | Stafford | |
| D505,184 S | 5/2005 | Trappa | |
| 6,948,527 B2 | 9/2005 | Ragner et al. | |
| D526,387 S | 8/2006 | Bonomi | |
| D542,382 S | 5/2007 | Cook | |
| D564,076 S | 3/2008 | Brockington et al. | |
| D575,377 S | 8/2008 | Roman | |
| D584,802 S | 1/2009 | Goodridge | |
| D586,433 S | 2/2009 | Price et al. | |
| D587,343 S | 2/2009 | Nobili | |
| D594,938 S | 6/2009 | Dirneder | |
| 7,549,448 B2 | 6/2009 | Ragner | |
| D600,322 S | 9/2009 | Forsythe | |
| D602,128 S | 10/2009 | Williams | |
| D602,565 S | 10/2009 | Nimberger | |
| 7,617,762 B1 | 11/2009 | Ragner | |
| D606,167 S | 12/2009 | Nimberger | |
| D607,538 S | 1/2010 | Nun | |
| D608,424 S | 1/2010 | Katsuta | |
| 7,721,754 B2 | 5/2010 | Knaus | |
| D616,969 S | 6/2010 | Zore | |
| D624,161 S | 9/2010 | Zore | |
| D624,628 S | 9/2010 | Haynes | |
| D627,863 S | 11/2010 | Ball | |
| D632,362 S | 2/2011 | Ito | |
| D632,764 S | 2/2011 | Cheng | |
| D634,406 S | 3/2011 | Klimas | |
| 7,900,972 B2 | 3/2011 | Wang et al. | |
| 7,921,882 B2 * | 4/2011 | Gebhardt | F16L 55/0331 138/26 |
| D638,915 S | 5/2011 | Cardno | |
| D645,547 S | 9/2011 | Lombardi | |
| D648,006 S | 11/2011 | Morishita | |
| D648,008 S | 11/2011 | Percoco | |
| D661,787 S | 6/2012 | Johnson | |
| D667,082 S | 9/2012 | Fukushima | |
| D667,930 S | 9/2012 | Yamada | |
| 8,291,941 B1 | 10/2012 | Berardi | |
| 8,291,942 B2 | 10/2012 | Berardi | |
| D681,171 S | 4/2013 | Yamamoto | |
| D686,699 S | 7/2013 | Evans | |
| D687,930 S | 8/2013 | Sacchetti | |
| D689,184 S | 9/2013 | Abe | |
| D719,244 S | 12/2014 | Yang | |
| 2002/0013974 A1 | 2/2002 | Gibson et al. | |
| 2004/0098095 A1 | 5/2004 | Burnside et al. | |
| 2004/0183302 A1 | 9/2004 | Allen et al. | |
| 2007/0012367 A1 | 1/2007 | Hotz | |
| 2007/0053749 A1 | 3/2007 | Jarvis et al. | |
| 2009/0071400 A1 * | 3/2009 | Soyland | B05B 5/1608 118/323 |
| 2009/0277525 A1 | 11/2009 | Jourdan | |
| 2012/0210752 A1 | 8/2012 | Ragner | |
| 2012/0234425 A1 | 9/2012 | Berardi | |
| 2013/0087205 A1 * | 4/2013 | Berardi | F16L 11/00 137/1 |

FOREIGN PATENT DOCUMENTS

| | | |
|---|---|---|
| EP | 2 106 897 A1 | 10/2009 |
| WO | WO 01/27582 A2 | 4/2001 |

OTHER PUBLICATIONS

XHose, available at http://asseenontvmarket.net/products/home-garden/xhose-expandable-garden-hose/, accessed on Aug. 26, 2014.
Expandable Hose, available at http://www.amazon.com/Worthtrust-Expandable-Garden-Water-Expands/dp/B00D2Y0R36, accessed on Aug. 26, 2014.
U.S. Appl. No. 29/421,855, filed Oct. 3, 2012.
U.S. Appl. No. 29/421,856, filed Oct. 3, 2012.
U.S. Appl. No. 29/421,857, filed Oct. 3, 2012.
U.S. Appl. No. 29/421,858, filed Oct. 3, 2012.
U.S. Appl. No. 13/832,788, filed Mar. 15, 2013.
U.S. Appl. No. 13/573,755, filed Oct. 3, 2012.

* cited by examiner

ELONGATABLE AND RETRACTABLE HOSE

CROSS REFERENCE TO RELATED APPLICATION

This application claims priority to U.S. Provisional Application Ser. No. 61/983,524, filed Apr. 24, 2014, the entire contents of which are incorporated herein by reference.

TECHNICAL FIELD

This invention relates to hoses that are configured to elongate when pressurized and to retract when the pressure is decreased.

DESCRIPTION OF RELATED ART

Hoses are popular tools for delivering fluids from one place to another. Garden hoses in particular are popular with homeowners and tradespersons for providing water from spigots to where it is needed. However, a hose's utility is often measured by its length and, until now, long hoses may be troublesome to manipulate and store. Traditionally, hoses had one fixed length, whether in use or in storage. Conventional hose storage solutions include reels and hooks, but many users lack the strength, coordination, patience or budget to implement these devices, and simply leave their hoses in disarray when through using them. Kinks and knots in improperly stored hoses can lead to premature failure as well.

Therefore, a solution is needed to provide a hose that has a substantial length, but is easily manipulated and storable.

SUMMARY OF THE INVENTION

This invention relates to hoses that are configured to elongate when pressurized and to retract when the pressure is decreased.

In general, in one aspect, the invention features an elongatable and retractable hose including an inner fluid conductor made of an elastomeric material having raised longitudinal ribs thereon, an outer jacket disposed around the inner fluid conductor, the hose being elongatable and retractable, and the ribs being configured to reduce friction between the inner fluid conductor and the outer jacket.

Implementations of the invention may include one or more of the following features. The hose may further include a first hose connector attached to a first end of the hose and a second hose connector attached to a second end of the hose opposite the first end. The hose may include a valve operable to close the second end of the hose.

A lubricant may be disposed between the inner fluid conductor and the outer jacket. The lubricant between the inner fluid conductor and the outer jacket may be silicone-based.

The outer jacket may be fabric. The outer jacket may be bunched up when the hose is in a retracted state and stretched out axially when the hose is in an elongated state.

Either or both of the first hose connector and the second hose connector may include a hose fitting including a fitting body having at least one barb extending from an outer surface thereof, the inner fluid conductor and outer jacket being disposed over the at least one barb, and a crimp ring disposed entirely around and deformed over the outer jacket, the inner fluid conductor and the at least one barb. The crimp ring may include a plurality of peaks and a plurality of troughs and the troughs may have a smaller inner dimension than an inner dimension of the peaks. The peaks may have a shorter circumferential length than a circumferential length of the troughs. The hose fitting may further include a cover removably engaged with the fitting body and disposed about the crimp ring.

BRIEF DESCRIPTION OF THE DRAWINGS

The above mentioned and other aspects, features and advantages can be more readily understood from the following detailed description with reference to the accompanying drawings, wherein.

DETAILED DESCRIPTION

Elongatable and retractable hoses are described herein, with reference to examples and exemplary embodiments. Specific terminology is employed in describing examples and exemplary embodiments. However, the disclosure of this patent specification is not intended to be limited to the specific terminology so selected and it is to be understood that each specific element includes all technical equivalents that operate in a similar manner.

Figure 1:
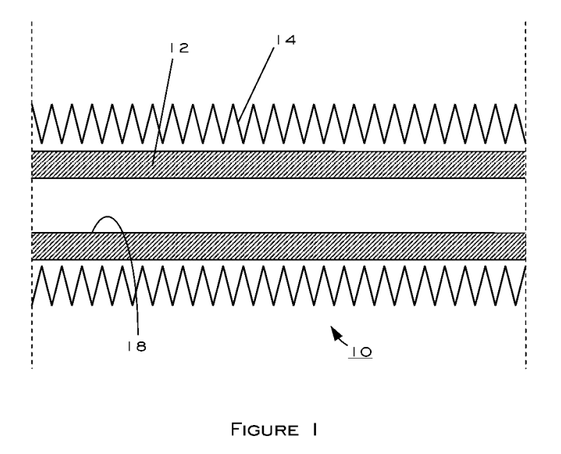
FIG. 1 is a cross sectional view of a hose according in a retracted state according to an exemplary embodiment of the present invention.
Figure 2:
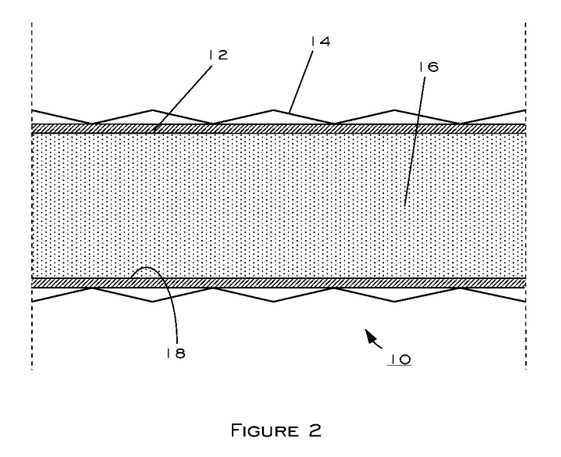
FIG. 2 is a cross sectional view of a hose in an elongated state according to another exemplary embodiment of the present invention.

Hoses 10 constructed according to the present invention may include an inner fluid conductor 12 and an outer jacket 14. FIG. 1 shows a cross sectional view of an exemplary hose 10 according to the present invention in a retracted state, and FIG. 2 shows the same hose 10 in an elongated state, pressurized with fluid 16.

The inner fluid conductor 12 may be made of an elastomer material such as, for example, silicone rubber, Viton® (E. I. Du Pont De Nemours And Company, Wilmington, Del.), thermoplastic elastomer, latex rubber, gum rubber or nitrile rubber.

Figure 14:
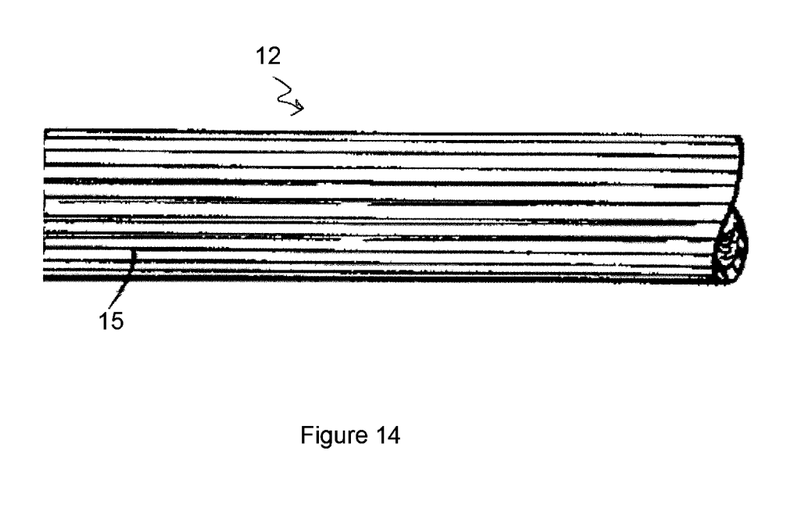
FIG. 14 is a perspective view of the inner fluid connector of the present invention.

As shown in FIG. 14, inner fluid conductor 12 has one or more raised longitudinal ribs 15 thereon. Ribs 15 may be formed integrally with inner fluid conductor 12, or may be affixed thereto, and run lengthwise along the outer surface of inner fluid conductor 12. Ribs 15 maintain a spacing between inner fluid conductor 12 and outer jacket 14 over at least a portion of the outer surface of inner fluid conductor 12. Inner fluid conductor 12 and outer jacket 14 are unconnected along their lengths and are free to move with respect to each other, and thus there is substantial contact between these components during stretching, elongating and contracting of inner fluid conductor 12. The spacing by ribs 15 helps to reduce friction between inner fluid conductor 12 and outer jacket 14 by decreasing the areas of contact between these components. This reduction in friction assists in reducing wear and maintaining durability of inner fluid conductor 12, particularly in comparison with a similar inner fluid conductor that has no raised ribs. Ribs 15 also structurally enhance the strength and durability of inner fluid conductor 12.

The outer jacket 14 is not limited to any specific material and may include, for example, fabric or plastic. Relative to the inner fluid conductor 12, the outer jacket 14 is less stretchable in a radial direction. However, the outer jacket 14 may be configured to stretch axially by a substantial distance. As one example, outer jacket 14 may include a "tube" of fabric (woven as such or sewn into a tube shape, for example), which is bunched up around the inner fluid conductor 12 when the hose 10 is in a retracted state and is fully or near fully un-bunched when the hose 10 is in an elongated state. As another example, outer jacket 14 may be a molded plastic accordion bellows.

When a pressurized fluid 16 is introduced into an inner conduit 18 of the inner fluid conductor 12, a force exerted by the pressurized fluid 16 onto the inner conduit walls 18 acts to stretch the inner fluid conductor's circumference radially outward. The inner fluid conductor 12 enlarges radially as long as the pressure of the fluid is sufficient to overcome the resistance to stretching of the material of the inner fluid conductor 12. An inner fluid conductor 12 made of a stiffer material, for example, will exhibit less stretching than an inner fluid conductor made of a softer material when a fluid having the same pressure is introduced into both conductors. Eventually, the inner fluid conductor stretches radially outward enough so that it receives resistance to further outward stretching from the outer jacket 14. The outer jacket 14 may be configured so as not to allow circumferential stretching of the inner fluid conductor 12 beyond a predetermined amount.

At the same time that the circumference of the inner fluid conductor 12 stretches outwardly, the inner fluid conductor 12 may also stretch in an axial direction. When the outer jacket 14 restricts further circumferential stretching of the inner fluid conductor 12, the pressure of the fluid 16 in the inner conduit 18 acts to stretch the inner fluid conductor 12 in an axial direction.

Figure 3:
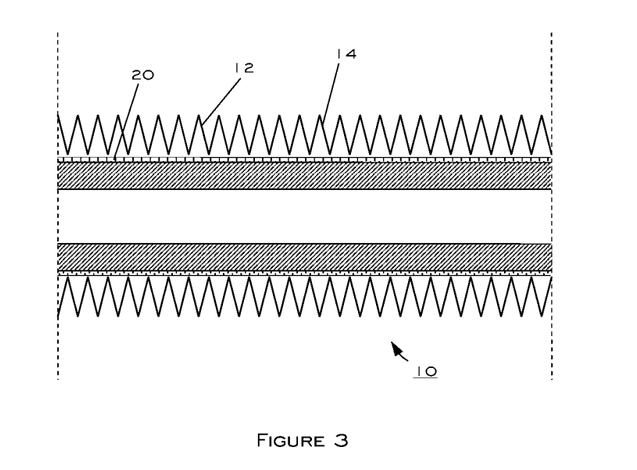
FIG. 3 is a cross sectional view of a hose according in a retracted state according to another exemplary embodiment of the present invention.
Figure 4:
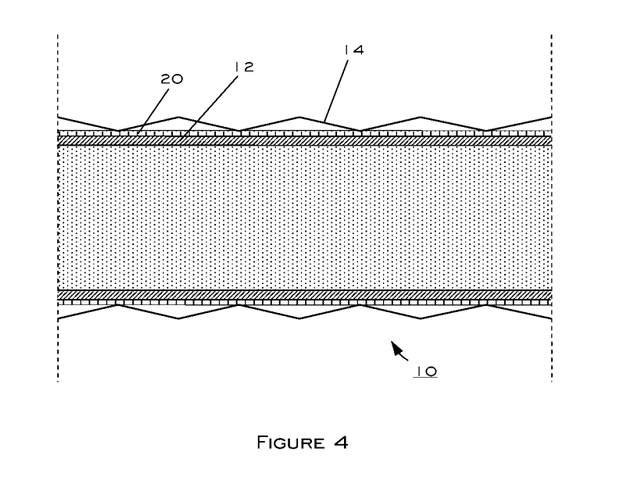
FIG. 4 is a cross sectional view of a hose in an elongated state according to another exemplary embodiment of the present invention.

During the stretching, elongating and retracting of the inner fluid conductor 12 and outer jacket, there is substantial contact and friction between these components. In an aspect of the present invention, shown in FIGS. 3 and 4, a lubricant 20 may be introduced between the inner fluid conductor 12 and the outer jacket 14 to reduce friction between these components. The material choice of the lubricant 20 is not limited and may include solid, liquid or paste-like lubricants. In a preferred example, the lubricant 20 is a powdered or spray-on silicone-based lubricant. In addition, a lubricant may provide benefits during manufacture of the hose such as allowing the outer jacket 14 to be fitted around the inner fluid conductor 12 with less friction.

Figure 5:
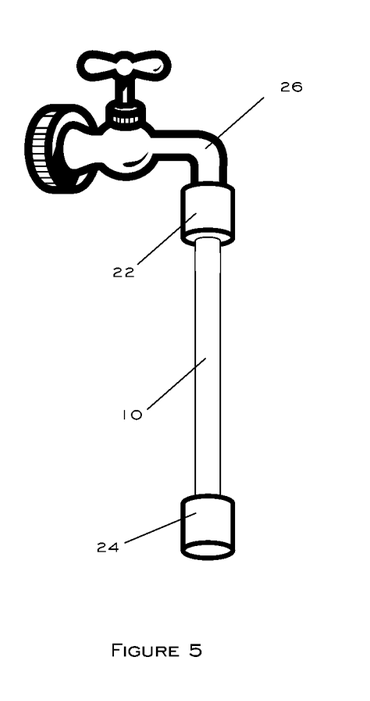
FIG. 5 is a notional view of a garden hose according to another exemplary embodiment of the present invention.

In one example, shown in FIG. 5, a garden hose includes an elongatable and retractable hose 10 according to the description above and hose fittings 22 and 24 at either end. One of the hose fittings 22 is connected to a spigot 26. The other hose fitting 24 may be provided with a valve to close the end of the hose. Alternatively, or in addition, a separate device may be attached to hose fitting 24. For example, a sprayer head may be threaded onto hose fitting 24. As another example, a valve, such as valve 28, shown in FIGS. 9A-9F, may be attached to hose fitting 24. When the spigot 26 is opened with the other end of the hose 10 closed (either by a valve in hose fitting 24 or by another attached device), the pressure of the water introduced into the hose 10 from the spigot 26 causes the hose 10 to elongate. The hose 10 will retain its elongated state as long as the pressure is maintained. When a user is through using the garden hose, he can close the spigot 26, open the end of the hose 10 to let the water drain out of the hose, and let the hose 10 retract as the inner fluid conductor 12 contracts back to its unpressurized state.

Figure 6A:
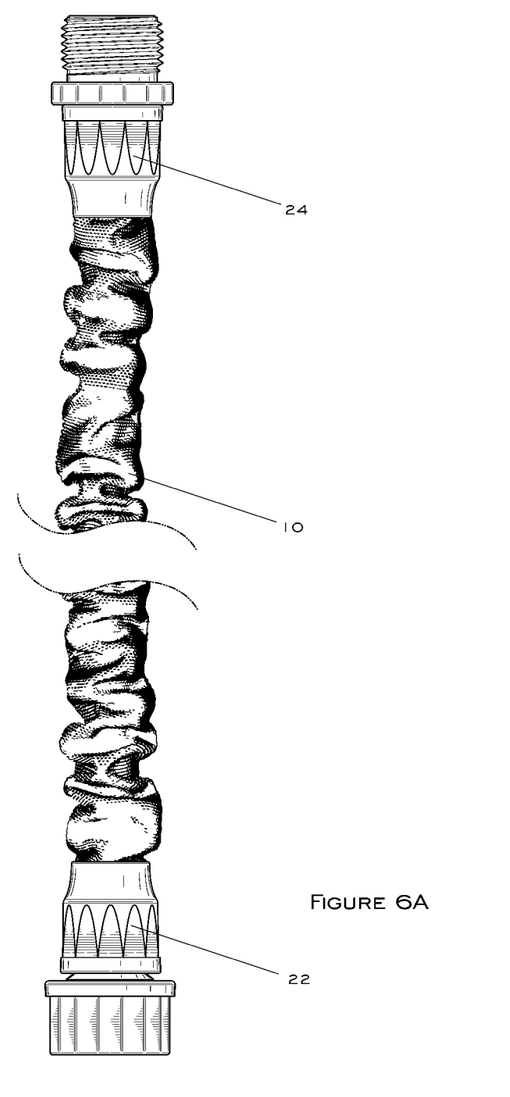
FIGS. 6A-6C are side, top and bottom views, respectively of a hose terminated by hose fittings, the sectioned hose showing indeterminate length thereof, according to another exemplary embodiment of the present invention.
Figure 6B:
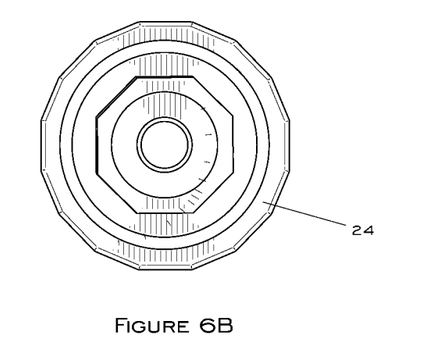
Figure 6C:
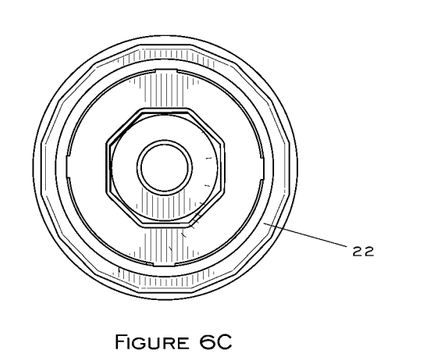
Figure 7A:
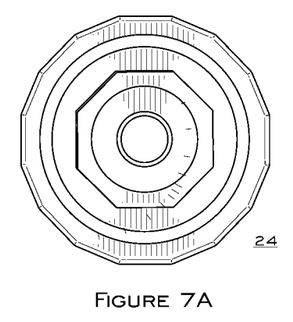
FIGS. 7A-7C are right side, front side and left side views, respectively, of a hose fitting according to another exemplary embodiment of the present invention.
Figure 7B:
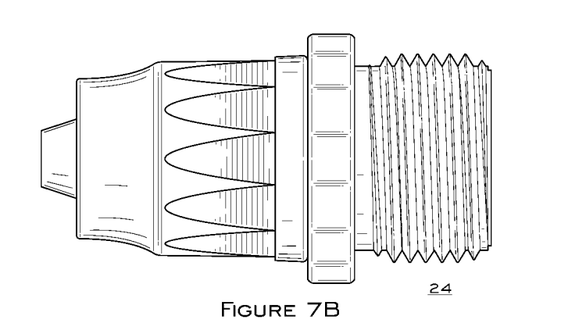
Figure 7C:
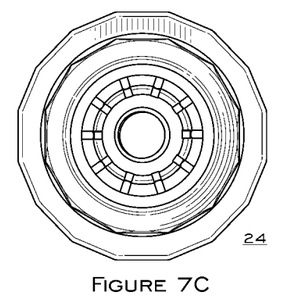
Figure 8A:
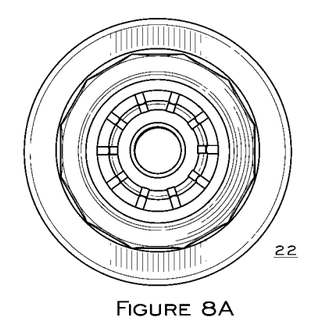
FIGS. 8A-8C are right side, front side and left side views, respectively, of a hose fitting according to another exemplary embodiment of the present invention.
Figure 8B:
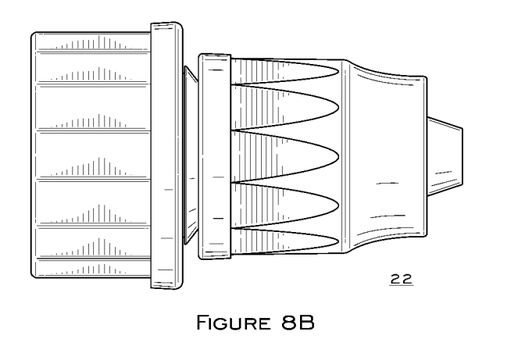
Figure 8C:
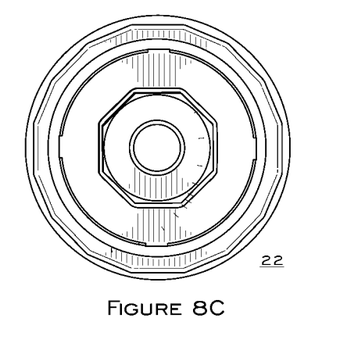
Figure 9A:
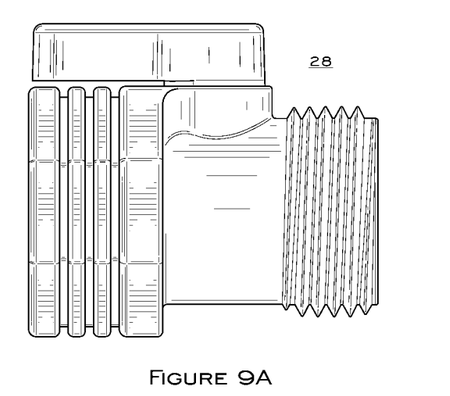
FIGS. 9A-9F are front side, top, rear side, bottom, right side and left side views, respectively, of a valve according to another exemplary embodiment of the present invention.
Figure 9B:
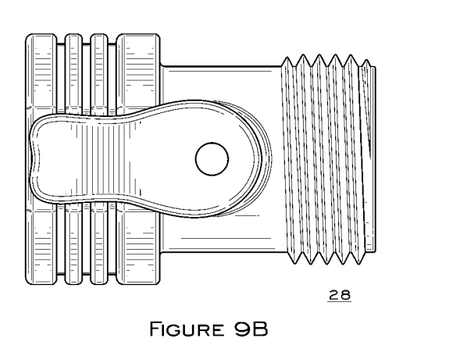
Figure 9C:
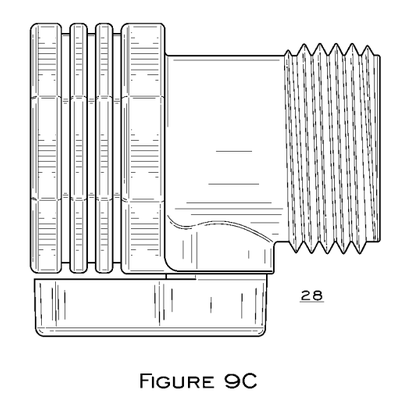
Figure 9D:
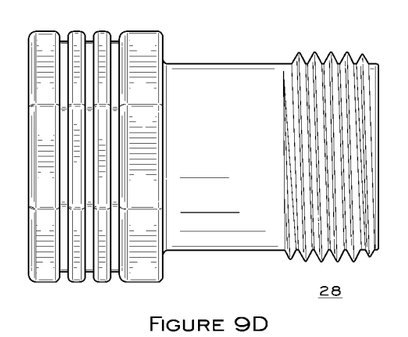
Figure 9E:
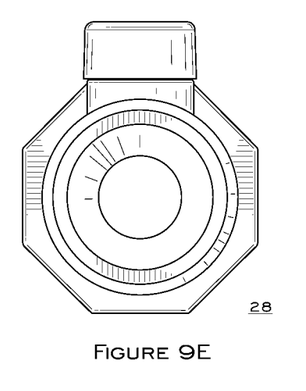
Figure 9F:
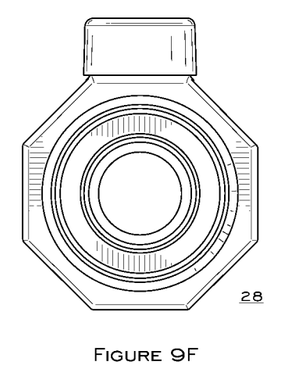

Various examples of hoses and fittings are shown in FIGS. 6A-9F. For example, FIGS. 6A-6C are side, top and bottom views, respectively of a hose 10 terminated by hose fittings 22 and 24, the sectioned hose showing indeterminate length thereof. As another example, FIGS. 7A-7C are right side, front side and left side views, respectively, of a hose fitting 24 with a male thread. As yet another example, FIGS. 8A-8C are right side, front side and left side views, respectively, of a hose fitting 22 with a female thread. As still another example, FIGS. 9A-9F are front side, top, rear side, bottom, right side and left side views, respectively, of a valve 28 which may be attached to hose fitting 24.

In another aspect of the present application, a hose 10 is attached to a hose fitting 22 or 24 by a barbed connection secured by a crimp ring 30. In the example shown in FIG. 10, a hose fitting 24 includes a fitting body 32 and a cover 34. Cover 34 is configured to fit over top of crimp ring 30 and engage fitting body 32. In the example shown, fitting body 32 engages cover 34 by a threaded connection. FIG. 11 shows a partial cross sectional view of the barbed connection shown in FIG. 10 taken along a plane parallel to a major axis of the hose. As shown in FIG. 11, the inner fluid conductor 12 and outer jacket are fitted about a barbed portion 36 of fitting 24. The barbed portion 36 includes one or more barbs 38 extending from an outer surface thereof which impinge the inner fluid conductor 12. A crimp ring 30 is fitted over the outer jacket 14 in an area of the barbs and crimped, i.e., deformed so as to reduce an inner dimension thereof. Accordingly, the crimp ring compresses the inner fluid conductor 12 and outer jacket 14 to the barb(s) 38, improving the security of the hose's connection to the fitting body 24.

Figure 10:
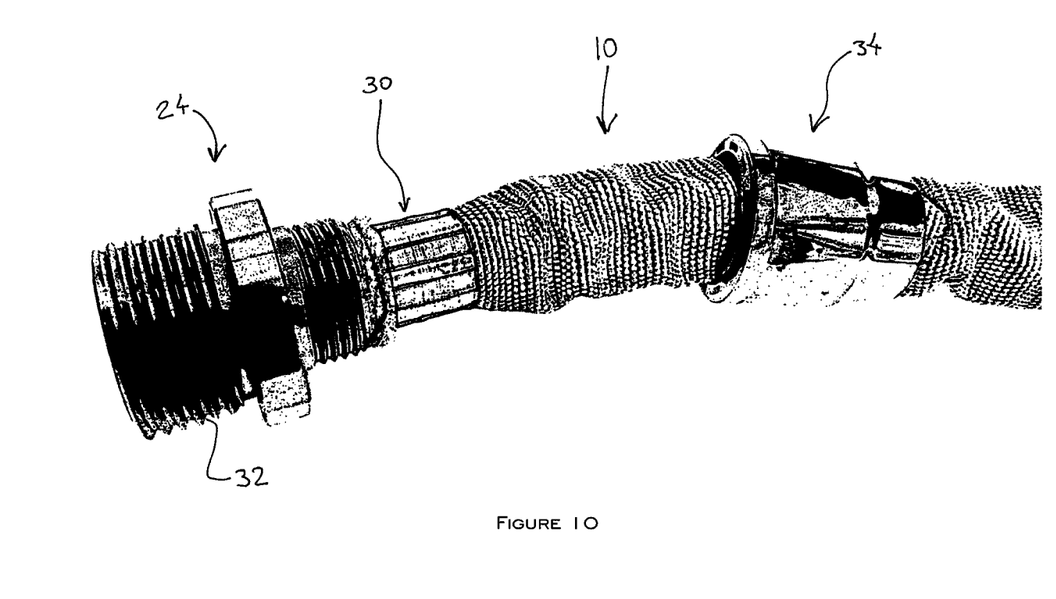
FIG. 10 is a perspective view of a hose and hose fitting according to an another exemplary embodiment of the present invention.
Figure 11:
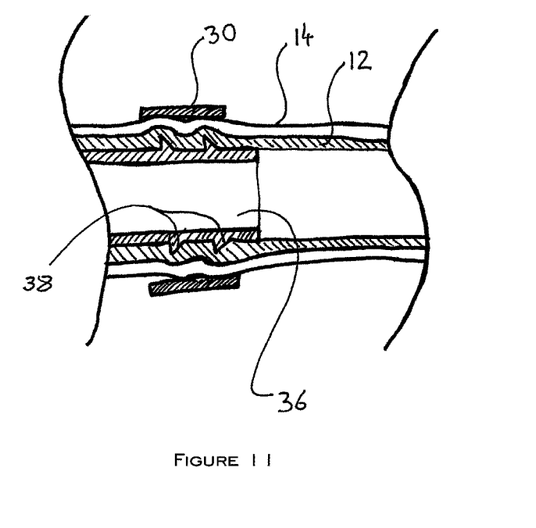
FIG. 11 is a partial cross sectional view of the barbed connection shown in FIG. 10 taken along a plane parallel to a major axis of the hose according to an another exemplary embodiment of the present invention.

In one example, shown in FIG. 10, the crimped crimp ring 30 has a deformed shape around its entire circumference.

Figure 12:
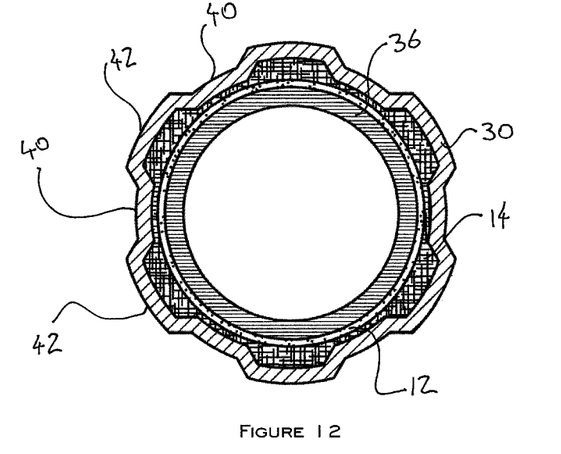
FIG. 12 is a cross sectional view of the barbed connection shown in FIG. 10 taken along a plane perpendicular to a major axis of the hose 10 according to an another exemplary embodiment of the present invention.
Figure 13:
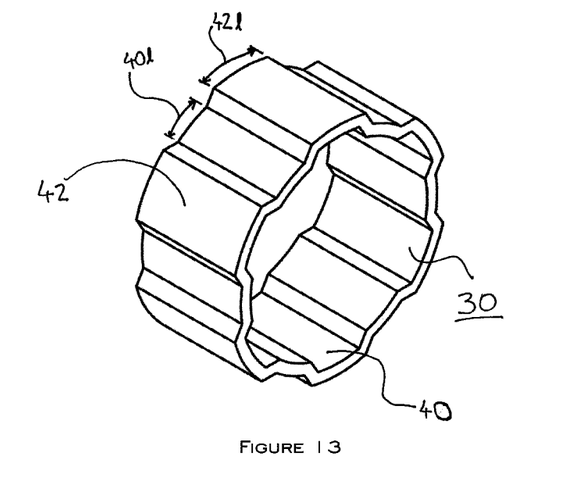
FIG. 13 is a perspective view of a crimp ring according to another exemplary embodiment of the present invention.

FIG. 12 is a cross sectional view of the barbed connection shown in FIG. 10 taken along a plane perpendicular to a major axis of the hose 10 and also shows the deformation of crimp ring 30 extending around its entire circumference. A crimped crimp ring 30 is shown by itself in FIG. 13. In the example shown, a crimp ring may be configured with one or more troughs 40 and one or more peaks 42. For example, a crimp ring may be configured with four or more peaks 42 and four or more peaks distributed around its circumference. A circumferential length 40k of trough may be configured equal to, less than, or more than a circumferential length 42k of an adjacent peak 42. In one particular example, circumferential peak lengths 42k for peaks 42 are less than circumferential trough lengths 40k of troughs 40 included on a crimp ring 30 having a plurality of peaks 42 and troughs 40.

In addition, the embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted for each other within the scope of this disclosure.

What is claimed:

1. A hose, comprising:
an inner fluid conductor made of an elastomeric material and having a plurality of raised longitudinal ribs on an outer surface thereof, the inner fluid conductor being configured to radially and axially expand; and
an outer jacket disposed around the inner fluid conductor;
wherein the hose is elongatable and retractable; and
wherein the ribs are movable between an expanded position and an unexpanded position corresponding to a state of the inner fluid conductor and configured to reduce friction between the inner fluid conductor and the outer jacket.

2. The hose of claim 1, further comprising a first hose connector attached to a first end of the hose and a second hose connector attached to a second end of the hose opposite the first end.

3. The hose of claim 2, wherein either or both of the first hose connector and the second hose connector include a hose fitting having a fitting body with at least one barb extending from an outer surface thereof, the inner fluid conductor and outer jacket being disposed over the at least one barb, and a crimp ring disposed entirely around and deformed over the outer jacket, the inner fluid conductor and the at least one barb.

4. The hose of claim 3, wherein the crimp ring includes a plurality of peaks and a plurality of troughs, the troughs having a smaller inner dimension than an inner dimension of the peaks, and each peak having a shorter circumferential length than a circumferential length of each trough.

5. The hose of claim 3, wherein the hose fitting includes a cover removably engaged with the fitting body and disposed about the crimp ring.

6. The hose of claim 2, further comprising a valve operable to close the second end of the hose.

7. The hose of claim 1, further comprising a lubricant disposed between the inner fluid conductor and the outer jacket.

8. The hose of claim 7, wherein the lubricant is silicone-based.

9. The hose of claim 1, wherein the outer jacket is fabric and is configured to be bunched up when the hose is in a retracted state and axially stretched when the hose is in an elongated state.

10. The hose of claim 3, wherein the crimp ring includes a plurality of peaks and a plurality of troughs, the troughs having a smaller inner dimension than an inner dimension of the peaks, and each trough having a shorter circumferential length than a circumferential length of each peak.

* * * * *